United States Patent
Borbely-Bartis

(10) Patent No.: US 10,317,982 B2
(45) Date of Patent: Jun. 11, 2019

(54) SEQUENCE POWER CONTROL

(71) Applicant: Micron Technology, Inc., Boise, ID (US)

(72) Inventor: Laszlo Borbely-Bartis, Santa Clara, CA (US)

(73) Assignee: Micron Technology, Inc., Boise, ID (US)

( * ) Notice: Subject to any disclaimer, the term of this patent is extended or adjusted under 35 U.S.C. 154(b) by 74 days.

(21) Appl. No.: 15/383,163

(22) Filed: Dec. 19, 2016

(65) Prior Publication Data

US 2017/0102759 A1 Apr. 13, 2017

Related U.S. Application Data

(63) Continuation of application No. 13/600,311, filed on Aug. 31, 2012, now Pat. No. 9,557,800.

(51) Int. Cl.
| | |
|---|---|
| *G06F 1/32* | (2019.01) |
| *G06F 1/3287* | (2019.01) |
| *G06F 1/3234* | (2019.01) |
| *G06F 3/06* | (2006.01) |

(52) U.S. Cl.
CPC ......... *G06F 1/3287* (2013.01); *G06F 1/3268* (2013.01); *G06F 3/0625* (2013.01); *G06F 3/0652* (2013.01); *G06F 3/0659* (2013.01); *G06F 3/0679* (2013.01); *Y02D 10/154* (2018.01)

(58) Field of Classification Search
CPC ..... G06F 1/3287; G06F 1/3268; G06F 3/0625
See application file for complete search history.

(56) References Cited

U.S. PATENT DOCUMENTS

| | | | |
|---|---|---|---|
| 6,795,781 B2 | 9/2004 | Aldridge et al. | |
| 7,512,029 B2 | 3/2009 | Roohparvar | |
| 8,108,850 B2 | 1/2012 | Chang et al. | |
| 8,161,304 B2 | 4/2012 | Hamilton | |
| 2007/0050571 A1* | 3/2007 | Nakamura | G06F 3/0626 711/154 |
| 2010/0050007 A1 | 2/2010 | Jiang | |
| 2010/0128381 A1* | 5/2010 | Guthrie | G06F 3/0625 360/75 |
| 2010/0169687 A1 | 7/2010 | Kimura | |
| 2010/0211808 A1 | 8/2010 | Jeong et al. | |
| 2010/0275050 A1 | 10/2010 | Hong | |
| 2011/0161899 A1 | 6/2011 | Ginetti et al. | |
| 2012/0017198 A1 | 1/2012 | Ng et al. | |
| 2012/0047359 A1 | 2/2012 | Raveendran | |
| 2012/0159208 A1* | 6/2012 | Intrater | G06F 1/3268 713/320 |

OTHER PUBLICATIONS

U.S. Appl. No. 13/561,632, entitled "Apparatus Power Control," filed Jul. 30, 2012, 26 pages.

* cited by examiner

*Primary Examiner* — Austin Hicks
(74) *Attorney, Agent, or Firm* — Brooks, Cameron & Huebsch, PLLC

(57) ABSTRACT

The present disclosure includes apparatuses and methods for sequence power control. A number of embodiments include executing a number of sequences associated with a number of commands, wherein a number of logical unit (LUN) controllers execute the number of sequences by locating power consumption information and a starting address of the number of sequences stored in a data structure on the number of LUN controllers.

20 Claims, 2 Drawing Sheets

| | SEQUENCE | START ADDRESS | POWER CONSUMPTION |
|---|---|---|---|
| 348-1 | SEQUENCE 1 | 20 | 5 |
| 348-2 | SEQUENCE 2 | 128 | 5 |
| 348-3 | SEQUENCE 3 | 56 | 3 |
| | ⋮ | ⋮ | ⋮ |
| 348-T | SEQUENCE T | 8 | 8 |

| | SEQUENCE | START ADDRESS | POWER CONSUMPTION |
|---|---|---|---|
| 348-1 | SEQUENCE 1 | 20 | 5 |
| 348-2 | SEQUENCE 2 | 128 | 5 |
| 348-3 | SEQUENCE 3 | 56 | 3 |
| | ⋮ | ⋮ | ⋮ |
| 348-T | SEQUENCE T | 8 | 8 |

SEQUENCE POWER CONTROL

PRIORITY INFORMATION

This application is a Continuation of U.S. application Ser. No. 13/600,311, filed Aug. 31, 2012, the contents of which are included herein by reference.

TECHNICAL FIELD

The present disclosure relates generally to apparatuses, such as semiconductor memory devices, systems, and controllers, and related methods, and more particularly, to sequence power control.

BACKGROUND

Memory devices are typically provided as internal, semiconductor, integrated circuits in computers or other electronic devices. There are many different types of memory including volatile and non-volatile memory. Volatile memory can require power to maintain its information, e.g., data, and includes random-access memory (RAM), dynamic random access memory (DRAM), synchronous dynamic random access memory (SDRAM), and static random access memory (SRAM) among others. Non-volatile memory can provide persistent information by retaining stored information when not powered and can include NAND flash memory, NOR flash memory, read only memory (ROM), Electrically Erasable Programmable ROM (EEPROM), Erasable Programmable ROM (EPROM), resistive random access memory (RRAM), and phase change random access memory (PCRAM), among others.

Memory devices can be combined together to form a solid state drive (SSD). A solid state drive can include non-volatile memory, e.g., NAND flash memory and NOR flash memory, and/or can include volatile memory, e.g., DRAM and SRAM, among various other types of non-volatile and volatile memory. Flash memory devices, such as floating gate flash devices and charge trap flash (CTF) devices may be utilized as non-volatile memory for a wide range of electronic applications. Flash memory devices typically use a one-transistor memory cell that allows for high memory densities, high reliability, and low power consumption.

An SSD can be used to replace hard disk drives as the main storage device for a computing system, as the solid state drive can have advantages over hard drives in terms of performance, size, weight, ruggedness, operating temperature range, and power consumption. For example, SSDs can have superior performance when compared to magnetic disk drives due to their lack of moving parts, which may avoid seek time, latency, and other electro-mechanical delays associated with magnetic disk drives. SSD manufacturers can use non-volatile flash memory to create flash SSDs that may not use an internal battery supply, thus allowing the drive to be more versatile and compact.

An SSD can include a number of memory devices, e.g., a number of memory chips. As one of ordinary skill in the art will appreciate, a memory chip can include a number of dies and/or logical units (LUNs), e.g., where a LUN can be one or more die. Each die can include a number of memory arrays and peripheral circuitry thereon. The memory arrays can include a number of memory cells organized into a number of physical pages, and the physical pages can be organized into a number of blocks. An array of flash memory cells can be programmed a page at a time and erased a block at a time. Managing and/or controlling the power consumed by SSDs using sequence power control can be useful in order to control battery life, for instance.

DETAILED DESCRIPTION

Figure 1:
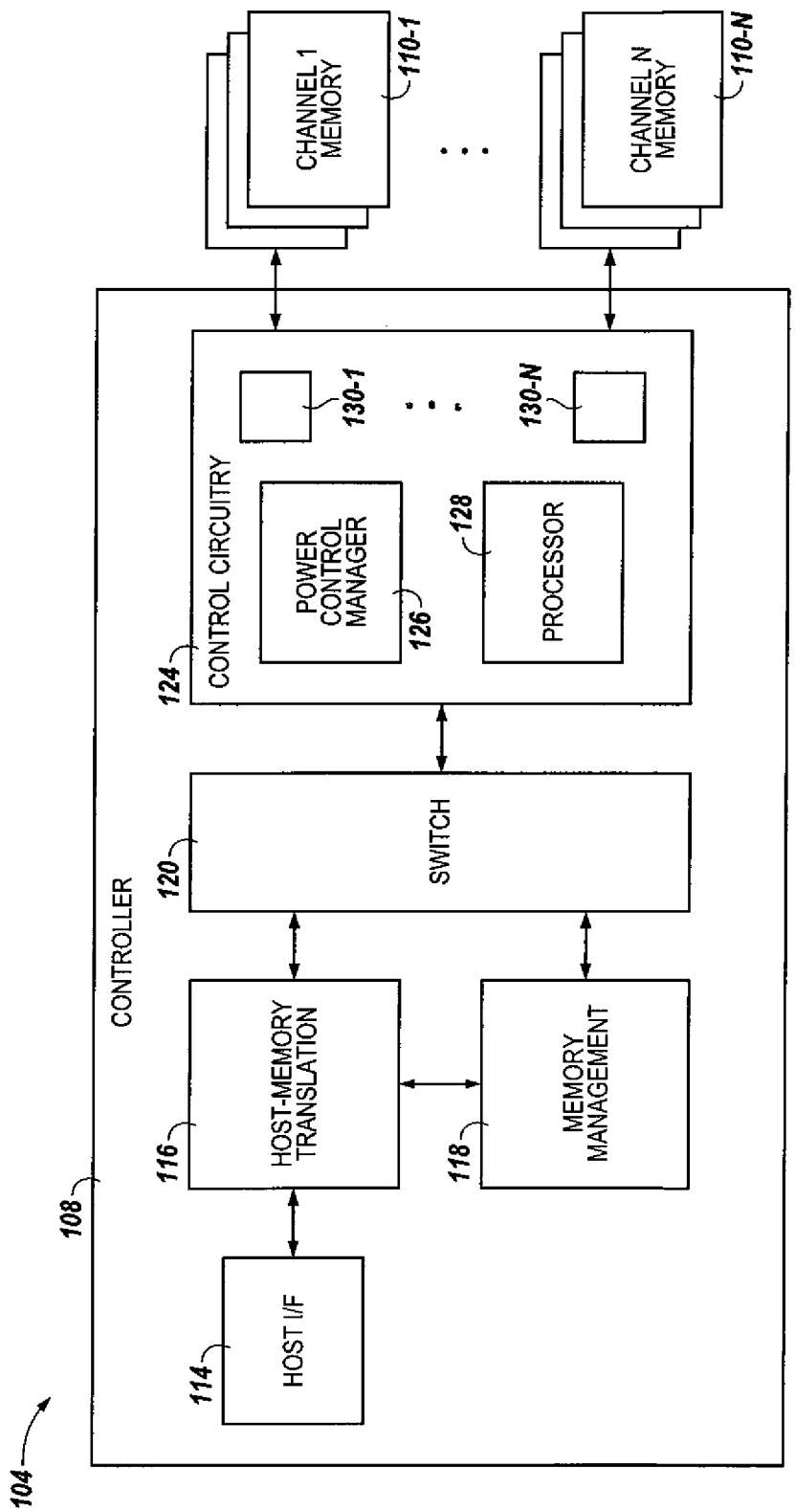
FIG. 1 is a functional block diagram of an apparatus in the form of a memory system in accordance with a number of embodiments of the present disclosure.

The present disclosure includes apparatuses and methods for sequence power control. A number of embodiments include executing a number of sequences associated with a number of commands, wherein a number of logical unit (LUN) controllers execute the number of sequences by locating power consumption information and a starting address of the number of sequences stored in a data structure on the number of LUN controllers.

In a number of embodiments, executing a command can be comprised of executing a number of sequences. The execution of a sequence can perform a step in the execution of a command. A memory system can include a number of sequences, wherein various combination of the number of sequences can be executed to execute commands on the memory system.

In a number of embodiments, instructions for a number of sequences can be written as source code and compiled using a compiler and/or assembler. The source code can include power consumption information for the number of sequences, so that when a compiler and/or assembler creates executable files for the number of sequences the executable files include power consumption information for the number of sequences.

In a number of embodiments, instructions for a number of sequences can be stored on a controller as executable files. A number of combinations of the number of sequences can be executed, e.g., performed, to execute commands, such as read, write, and/or erase, for example, on a memory system. Also, a number of combinations of the number of sequences can be executed, e.g., performed, to execute data sense, data transfer, and/or data program commands on a memory system. A number of combinations of the number of sequences can be executed, e.g., performed, to execute non-array commands, such as a set features command, a set trim command, a set trimx command, a read ID command, a read unique ID command, and/or a read parameter page command, among others, for example. The non-array commands can be used to control the state and/or setting of the control circuitry of a controller. The instructions for the number of sequences can be stored in a sequencer, for example, and a LUN controller can execute the number of sequences to execute the commands received by the LUN controller. The LUN controller can include memory for storing a data structure, e.g., a look-up table, that can include information, such as the starting address of the instructions for the number of sequences and power consumption information for the number of sequences. The power consumption information can be used by a memory system to regulate power consumption of the memory system when performing the number of sequences.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, "a number of" something can refer to one or more of such things. For example, a number of memory devices can refer to one or more memory devices. As used herein, the designators "M", "N", and "T", particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 130 may reference element "30" in FIG. 1, and a similar element may be referenced as 230 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present invention, and should not be taken in a limiting sense.

FIG. 1 is a functional block diagram of an apparatus in the form of a memory system 104 in accordance with a number of embodiments of the present disclosure. As used herein, a memory system 104, a controller 108, or a memory device 110 might also be separately considered an "apparatus." The memory system 104 can be used as an external, e.g., portable, memory system for a computing system. The memory system 104, e.g., a solid state drive (SSD), can include controller 108 coupled to memory, e.g., a number of solid state memory devices 110-1, ..., 110-N. The solid state memory devices 110-1, ..., 110-N can provide a storage volume for the memory system 104. In a number of embodiments, the number of memory devices 110-1, ..., 110-N can include non-volatile memory including a number of logical units (LUNs). A LUN can be a portion of non-volatile memory that can be independently controllable. Also, the controller can include volatile and/or non-volatile memory.

A solid state memory device 110-1, ..., 110-N can include a number of arrays of memory cells, e.g., non-volatile memory cells. The arrays can be flash arrays with a NAND architecture, for example. In a NAND architecture, the control gates of memory cells of a "row" can be coupled with an access, e.g., word, line, while the memory cells can be coupled in series source to drain in a "string" between a select gate source transistor and a select gate drain transistor. The string can be connected to a data, e.g., bit, line by the select gate drain transistor. The use of the terms "row" and "string" implies neither a linear nor an orthogonal arrangement of memory cells. As will be appreciated by those of ordinary skill in the art, the manner of connection of the memory cells to the bit lines and source lines depends on whether the array is a NAND architecture, a NOR architecture, or some other memory array architecture.

The solid state memory devices 110-1, ..., 110-N can include a number of memory cells that can be grouped. As used herein, a group can include a number of memory cells, such as a page, block, plane, die, an entire array, or other groups of memory cells. For example, some memory arrays can include a number of pages of memory cells that make up a block of memory cells. A number of blocks can be included in a plane of memory cells. A number of planes of memory cells can be included on a die. As an example, a 128 GB memory device can store 4320 bytes of information per page, 128 pages per block, 2048 blocks per plane, and 16 planes per device.

In FIG. 1, channel 1 memory 110-1 can include a number of dies of memory cells that are coupled to the memory system 104 via channel 1 and channel N memory 110-N can include a number of dies of memory cells that are coupled to the memory system 104 via channel N. Channel 1 memory 110-1 can be associated with channel controller 130-1 and channel N memory 110-N can be associated with channel controller 130-N on control circuitry 124. In a number of embodiments, each channel associated with a solid state memory device, such as solid state memory devices 110-1, ..., 110-N in FIG. 1, can be associated with a channel controller. The channel controller can be used to execute a number of sequences associated with the commands received at each channel.

The controller 108 can include host interface (I/F) 114, host-memory translation circuitry 116, memory management circuitry 118, a switch 120, and/or control circuitry 124. As described herein, portions of controller 108 can be provided in the form of an ASIC, however, embodiments are not so limited.

The controller 108 can communicate with the solid state memory devices 110-1, ..., 110-N to read, write, and erase information, among other operations. The controller 108 can have firmware and/or circuitry that may be a number of integrated circuits and/or discrete components. For a number of embodiments, the circuitry in controller 108 may include control circuitry 124 for controlling access across the solid state memory devices 110-1, ..., 110-N and circuitry for providing a translation layer between a host and the memory system 104. Thus, a controller could selectively couple an I/O connection (not shown in FIG. 1) of a solid state memory device 110-1, ..., 110-N to receive the appropriate signal at the appropriate I/O connection at the appropriate time. Similarly, the communication protocol between a host and the memory system 104 may be different than what is required for access of a solid state memory device 110-1, ..., 110-N. Controller 108 could then translate the commands received from a host into the appropriate commands to achieve the desired access to a solid state memory device 110-1, ..., 110-N.

The host I/F 114 can include a physical interface to couple the memory system 104 to a host. The host I/F 114 can include a peripheral component interconnect express (PCIe) circuit providing a physical layer, link layer, and transport or transaction layer interface, e.g., where the host is configured to transmit information according to a PCIe standard. In a number of embodiments, the host I/F 114 can be coupled to host-memory translation circuitry 116.

In general, the host I/F 114 can include circuitry that is responsible for converting command packets received from the host, e.g., from a PCIe bus, into command instructions for the host-memory translation circuitry 116 and for converting host-memory translation responses into host commands for transmission to the requesting host. For example, the host I/F 114 can construct SATA command packets from PCIe based transaction layer packets. In a number of embodiments, the number of commands that are provided to controller 108, e.g. via host I/F 114, can be throttled based on the ability of the memory system 104 to execute commands, for instance.

The host-memory translation circuitry 116 can be coupled to the host I/F 114, to the memory management circuitry 118, and/or to the switch 120. The host-memory translation circuitry 116 can be configured to translate host addresses to memory addresses, e.g., addresses associated with a received command such as a read and/or write command. The host-memory translation circuitry 116 can include error detection/correction circuitry, such as RAID exclusive or (XOR) circuitry. The RAID XOR circuitry can calculate parity information based on information received from the host I/F 114.

The memory management circuitry 118 can be coupled to the host-memory translation circuitry 116 and/or to the switch 120. The memory management circuitry 118 can control a number of processes including, but not limited to, initialization, wear leveling, e.g., garbage collection and/or block reclamation, and error correction, e.g., via operation of a processor.

Control circuitry 124 includes power control manager 126, processor 128, and channel controllers 130-1, . . . , 130-N. The control circuitry 124, e.g., non-volatile memory control circuitry, can be coupled to the switch 120 and to a number of non-volatile memory devices 110. In some embodiments, the controller 108 can include control circuitry, such as channel controllers 130-1, . . . , 130-N, for all memory channels. Control circuitry 124 can include processor 128 to execute instructions, e.g., software and/or firmware, according to a number of embodiments of the present disclosure. While the control circuitry 124 can include a processor 128, a number of embodiments of the present disclosure provide for control of memory operations in circuitry, e.g., hardware, without relying on the execution of instructions, e.g., software and/or firmware, by the processor 128. Such embodiments can provide for faster memory operations relative to some previous approaches that rely more heavily on a processor to control memory operations.

The control circuitry 124 can receive commands, such as read, write, and/or erase commands, from a host, e.g., via host I/F 114, and/or from memory management circuitry 118, e.g., in association with wear leveling operations. The commands received by the control circuitry can be assigned to a memory device for execution, such as memory device 110-1 or 110-N. The channel controller associated with the memory devices that are assigned the commands, such as channel controller 130-1 associated with memory device 110-1 or channel controller 130-N associated with memory device 110-N, can be used for execution of the command. The channel controllers can include a number of LUN controllers, that are associated with each LUN on a channel, to execute the command. The LUN controllers, located on the channel controllers, can execute a number of sequences, e.g., programs or subroutines, that comprise the command. Each sequence of the number of sequences can include instructions for completing a step of the command. A command can be executed when each of the sequences associated with the command have been executed. Information about the sequences associated with the commands can be stored in the channel controller 130 and can be used by a power control manager 126 to permit execution of the sequences, which is described in further detail in association with FIGS. 2 and 3.

The channel controller 130 can request permission from the power control manager 126 to perform a number of sequences and send power consumption information to the power control manager 126. The power control manager 126 can grant permission to execute the number of sequences in the request from the channel controller 130. The permission to perform the number of sequences can be based on an analysis of the power consumption information of the number of sequences.

The memory system 104 illustrated in FIG. 1 can include additional circuitry beyond what is illustrated. The detail of the memory system 104 illustrated in FIG. 1 has been reduced so as not to obscure embodiments of the present disclosure. For example, the memory system 104 can include address circuitry to latch address signals provided over I/O connections through I/O circuitry. Address signals can be received and decoded by a row decoder and a column decoder to access the solid state memory devices 110-1, . . . , 110-N. It will be appreciated by those skilled in the art that the number of address input connections can depend on the density and architecture of the solid state memory devices 110-1, . . . , 110-N.

Figures 2, 3:
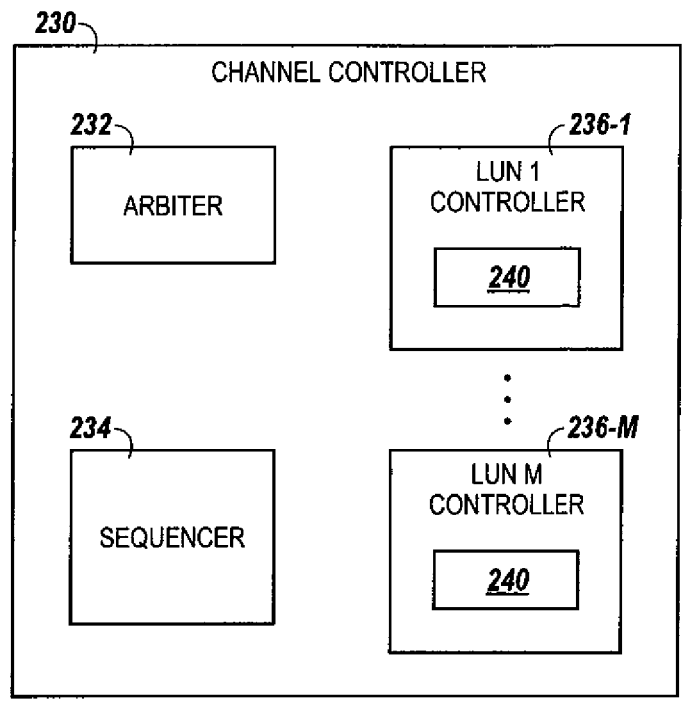
FIG. 2 illustrates a channel controller of a memory system in accordance with a number of embodiments of the present disclosure.
FIG. 3 illustrates a data structure for a number of sequences in accordance with a number of embodiments of the present disclosure.

FIG. 2 illustrates a channel controller 230 of a memory system in accordance with a number of embodiments of the present disclosure. In FIG. 2, channel controller 230 includes arbiter 232, sequencer 234, and a number of logical unit (LUN) controllers 236-1, . . . , 236-M. Channel controller 230 can be associated with a channel that couples the channel controller 230 to memory devices, such as memory devices 110-1, . . . , 110-N in FIG. 1.

In a number of embodiments, arbiter 232 can receive commands and allocate the commands to LUN controllers 236-1, . . . , 236-M for execution. Commands can be associated with a number of sequences that can be performed to complete the execution of the commands. The LUN controllers 236-1, . . . , 236-M can execute the commands by locating a number of sequences associated with the commands in a data structure, e.g., look-up table 240, which can be stored in memory on the LUN controllers 236-1, . . . , 236-M, for instance. The look-up table 240, which will be described in more detail below in association with FIG. 3, can include information about a number of sequences, including power consumption information and the starting address of instructions for each of the number of sequences. The instructions for each of the number of sequences can be stored in a data structure memory in sequencer 234. Sequencer 234 can store instructions for each of a number sequences associated with the commands that can be executed by a memory system. Each command is associated with a combination of the sequences stored in sequencer 234 that are performed to execute each command. The instructions are located at the address in sequencer 234 indicated as the starting address for each sequence in look-up table 240.

The LUN controllers 236-1, . . . , 236-M can send a request to a power control manager, e.g., power control manager 126 shown in FIG. 1, for permission to execute the number of sequences associated with the commands. The request can include the power control information for each of the number of sequences. Upon receiving permission from the power control manager to execute the number of sequences, the LUN controllers 236-1, . . . , 236-M can locate instructions for the number of sequences by finding the starting address of each of the number sequences in look-up table 240 and obtaining the instructions stored in sequencer 235 at the starting address indicated in look-up table 240.

FIG. 3 illustrates a data structure 340 for a number of sequences in accordance with a number of embodiments of the present disclosure. In FIG. 3, the data structure is a look-up table 340, and includes information that identifies a number of sequences 342, the starting address 344 of the number of sequences, and power consumption information 346 of the number of sequences. The power consumption information can include a power consumption level associated with performing a particular sequence. Look-up table 340 can identify a number of sequences 342 that are associated with a number of commands that can be performed by a memory system. A number of commands, such as read, write, and/or erase commands, among other, for example, can be executed by performing a number of sequences. For example, execution of a command can be comprised of a number of steps each of which are completed by performing a sequence associated with accomplishing that step. Look-up table 340 can identify each of the sequences 342 to be performed to accomplish the steps of particular commands executable by a memory system.

In FIG. 3, look-up table 340 includes information about a number of sequences 348-1, 348-2, 348-3, . . . , 348-T. Sequence 348-1 has a start address of 20 and a power consumption level of 5, sequence 348-2 has a start address of 128 and a power consumption level of 5, sequence 348-3 has a start address of 56 and a power consumption level of 3, and sequence 348-T has a start address of 8 and a power consumption level of 8. The power consumption level can indicate the amount of power consumed during performance of the particular sequence. For example, a sequence having a power consumption level of 5 can indicated less power consumption than a power consumption level of 8. The power consumption information 346 provided in look-up table 340 can include information that identifies the amount, or relative amount, of power consumed in association with performing a sequence.

In a number of embodiments, a LUN controller, such as LUN 1 controller 236-1 in FIG. 2, can receive a command from an arbiter, such as arbiter 232 in FIG. 2. The LUN controller can locate the sequences associated with the command in the look-up table 340. For example, a particular command may be associated with sequences 348-1 and 348-3. The LUN controller can determine that sequence 348-1 has a power consumption level of 5 and sequence 348-3 has a power consumption level of 3. The LUN controller can send a request to perform sequences 348-1 and 348-3 to a power control manager, such as power control manager 126 in FIG. 1, and the request can include the power consumption information for sequences 348-1 and 348-3. The power control manager can perform an analysis of all the requests it receives taking into consideration the power consumption information for the sequences that have been requested. Based on the analysis of the requests, the power control manager can grant the request of the LUN controller to perform sequences 348-1 and 348-3. The LUN controller can access the look-up table 340 to determine that the instructions for sequence 348-1 are located at starting address 20 and the instructions for sequence 348-3 are located at starting address 56. The instructions for sequences 348-1 and 348-3 can be stored in memory on a sequencer, such as sequencer 234 in FIG. 2. The LUN controller can obtain the instructions for sequences 348-1 and 348-3 from the sequencer. The LUN controller can execute the command received by the LUN controller by executing sequences 348-1 and 348-3.

CONCLUSION

The present disclosure includes apparatuses and methods for apparatus power control. A number of embodiments include executing a number of sequences associated with a number of commands, wherein a number of logical unit (LUN) controllers execute the number of sequences by locating power consumption information and a starting address of the number of sequences stored in a data structure on the number of LUN controllers.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. As used herein, the term "and/or" includes any and all combinations of a number of the associated listed items.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for sequence power control in an apparatus, comprising:

receiving a plurality of commands and executing a particular command of the plurality of the commands, wherein the particular command comprises a number of sequences, wherein executing the command includes:

receiving permission from a power control manager to execute a first portion of the number of sequences based on an analysis of power consumption information of the plurality of commands, wherein the power consumption information for the number of sequences is included in a source code;

locating the starting address of the first portion the number of sequences and obtaining stored instructions;

performing the first portion of the number of sequences in an order received from a LUN controller;

receiving permission from the power control manager to execute a second portion of the number of sequences based on an analysis of power consumption information of the plurality of commands and in response to completing performance of the first portion of the number of sequences; locating the starting address of the second portion the number of sequences and obtaining stored instructions; and
performing the second portion of the number of sequences in the order received from the LUN controller.

2. The method of claim 1, wherein the method includes approving execution of the portion of the number of sequences by the power control manager.

3. The method of claim 1, wherein the method includes compiling the source code that includes instructions and power consumption information for the number of sequences to create a number of executable files having instructions and power consumption information for each of the number of sequences.

4. The method of claim 1, wherein the method includes assigning the power consumption information to each respective sequence of the number of sequences based on the command associated with the respective sequence.

5. The method of claim 4, wherein the command associated with the respective sequence is a read command.

6. The method of claim 4, wherein the command associated with the respective sequence is a write command.

7. The method of claim 4, wherein the command associated with the respective sequence is an erase command.

8. The method of claim 4, wherein the command associated with the respective sequence is a data program command.

9. The method of claim 4, wherein the command associated with the respective sequence is a data sense command.

10. A method for sequence power control in an apparatus, comprising:
receiving a plurality of commands including a particular command, wherein each of the plurality of commands comprise a combination of a number of sequences in a particular order, wherein each of the number of sequences correspond to a particular step of the particular command when executed and by locating the command for each of the number of sequences by finding the starting address of each of the number of sequences; and
executing the particular command, wherein executing the particular command includes:
performing a first portion of the number of sequences in an order received from a LUN controller, in response to receiving permission to perform the first portion of the number of sequences from a power control manager, wherein the first portion of the number of sequences is selected by the power control manager based on an analysis of an amount of power to be consumed by the plurality of commands during execution of the first portion of the number of sequences; and
performing a second portion of the number of sequences in the order received from the LUN controller, in response to receiving permission to perform the second portion of the number of sequences from the power control manager, wherein the second portion of the number of sequences is selected by the power control manager based on an analysis of an amount of power to be consumed by the plurality of commands during execution of the second portion of the number of sequences and in response to completing performance of the first portion of the number of sequences.

11. The method of claim 10, wherein the amount of power consumed during execution of the first portion of the number of sequences is indicated by power consumption information in a number of executable files.

12. The method of claim 10, wherein executing the command includes locating the first portion of the number of sequences that are associated with the command using a starting location of the number of sequences found in a data structure.

13. The method of claim 10, wherein executing the command includes determining whether power is available for execution of the first portion of the number of sequences that are associated with the command based on the power consumption information of each of the number of sequences that are associated with the command.

14. The method of claim 10, wherein the method includes assigning power consumption information to each of the number of sequences based on their associated command.

15. An apparatus, comprising:
a memory comprising a number of logical units (LUNs); and
a controller coupled to the memory and configured to control:
selection of a number of sequences, wherein the number of sequences performed in a particular order comprise a command, wherein the selection is based on receiving permission from a power control manager and locating instructions for each of the number of sequences by finding a starting address for each of the number of sequences; and
execution of the command by performing a first portion of the number of sequences in an order received from a LUN controller, in response to receiving permission to execute the first portion of the number of sequences from the power control manager, wherein each of the number of sequences correspond to a particular step of the command when executed, and wherein the first portion of the number of sequences is performed based on an analysis of the amount of power to be consumed by a plurality of commands received by the apparatus during execution of the first portion of the number of sequences, and by performing a second portion of the number of sequences in the order received from the LUN controller, in response to receiving permission to execute the second portion of the number of sequences from the power control manager, wherein the second portion of the number of sequences is performed based on the analysis of the amount of power to be consumed by the plurality of commands received by the apparatus during execution of the second portion of the number of sequences and in response to completing performance of the first portion of the number of sequences, and wherein the power consumption information for the number of sequences is included in a source code.

16. The apparatus of claim 15, wherein each of the number of sequences includes power consumption information that indicates the amount of power consumed during execution of each of the number of sequences.

17. The apparatus of claim 15, wherein the controller is configured to control execution of the number of sequences by locating instructions for the number of sequences using a starting location of the number of sequences found in a data structure.

18. The apparatus of claim 15, wherein instructions for the number of sequences are stored in a sequencer.

19. The apparatus of claim 18, wherein the instructions for the number of sequences stored in the sequencer include power consumption information for the number of sequences.

20. The apparatus of claim 15, wherein the controller includes a number of channel controllers, and wherein the number of channel controllers include a number of LUN controllers.

\* \* \* \* \*